Feb. 24, 1925.　　　　　　　　　　　　　　　　　　　　　1,527,597
R. F. MacMICHAEL
APPARATUS FOR DETERMINING THE RELATIVE DENSITY OF TWO GASES
Filed Jan. 22, 1921　　　3 Sheets-Sheet 1

WITNESSES.　　　　　　　　　　　　　　　　　　INVENTOR.

Feb. 24, 1925.                                                            1,527,597
R. F. MacMICHAEL
APPARATUS FOR DETERMINING THE RELATIVE DENSITY OF TWO GASES
Filed Jan. 22, 1921                3 Sheets-Sheet 2

WITNESSES
A. E. Duran
Alma Riggert

INVENTOR.
Ross F. MacMichael
By Charles W. Neil Atty

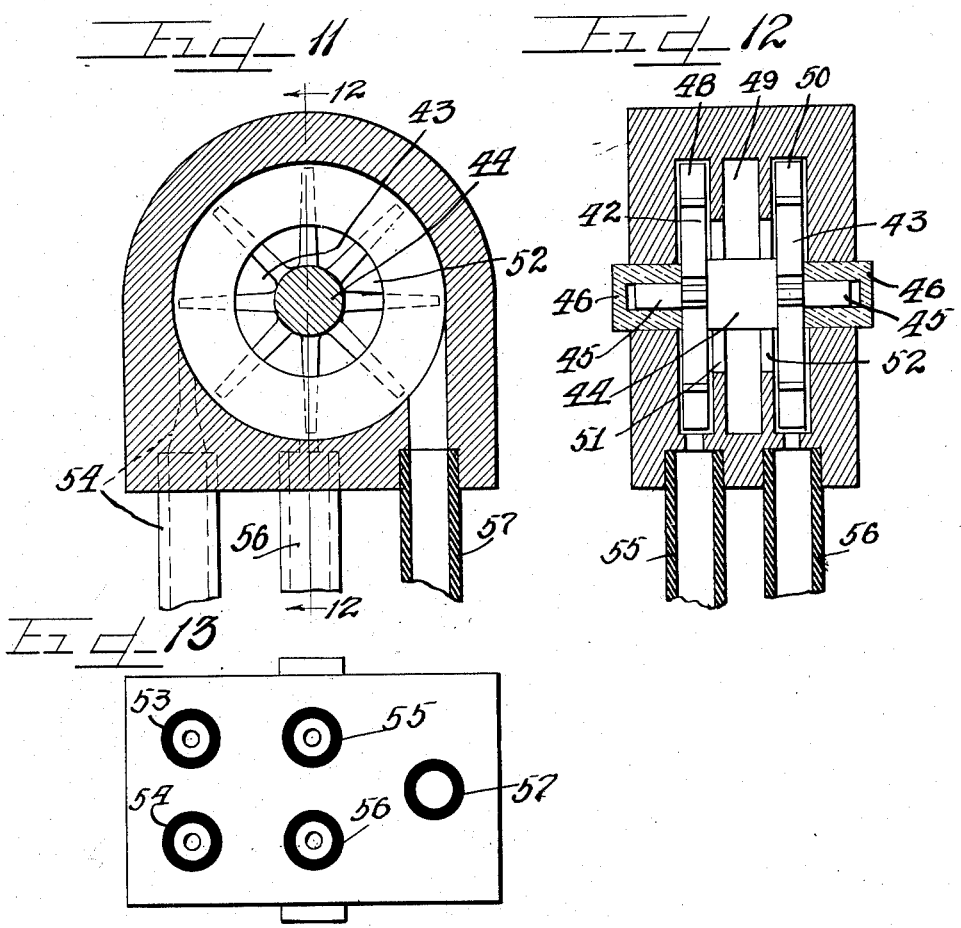

Patented Feb. 24, 1925.

1,527,597

UNITED STATES PATENT OFFICE.

ROSS F. MacMICHAEL, OF CHICAGO, ILLINOIS; ADELOR J. PETIT, JR., ADMINISTRATOR OF SAID ROSS F. MacMICHAEL, DECEASED, ASSIGNOR TO MARY L. MacMICHAEL, OF DETROIT, MICHIGAN.

APPARATUS FOR DETERMINING THE RELATIVE DENSITY OF TWO GASES.

Application filed January 22, 1921. Serial No. 439,095.

*To all whom it may concern:*

Be it known that I, Ross F. MacMichael, a citizen of the United States, and a resident of the city of Chicago, in the county of Cook and State of Illinois, have invented certain new and useful Improvements in an Apparatus for Determining the Relative Density of Two Gases; and I do hereby declare that the following is a full, clear, and exact description of the same, reference being had to the accompanying drawings, and to the numerals of reference marked thereon, which form a part of this specification.

This invention relates to improvements in apparatus for determining the relative density of two gases with particular reference to determining the $CO_2$ content of flue gases from furnaces or the like.

One of the objects of this invention is the provision of an apparatus for determining the $CO_2$ content of flue gases wherein all the parts are mechanically operated and in which no chemicals are necessary.

Another object of this invention is the provision of such an apparatus which is simple in construction, readily operated and not likely to get out of order and which has a very low operating cost.

Still another object of this invention is the provision of an apparatus of the class described wherein a very large gas sample may be used and which gives practically instantaneous results, so that the condition of the furnaces may be known at any time without the delay necessarily attendant upon a chemical analysis.

Still another important object of this invention is the provision of an apparatus for determining the $CO_2$ content of flue gases and which is adapted to be used with an automatic control for a furnace.

Other and further important objects of this invention will be apparent from the disclosures in the accompanying drawings and specification.

The invention (in a preferred form) is illustrated in the drawings and hereinafter more fully described.

Figure 2:
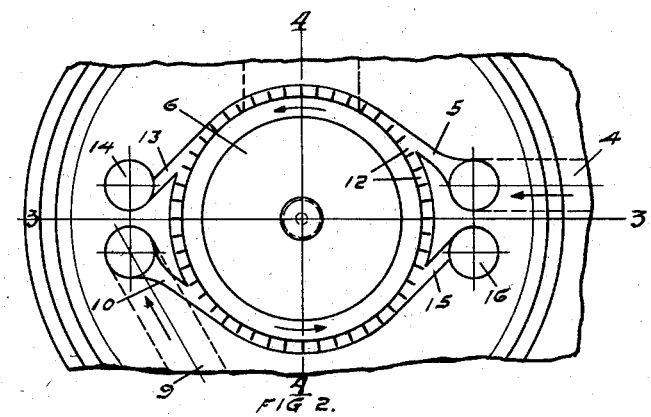
Figure 2 is a plan view of the rotor and nozzles.
Figure 3:
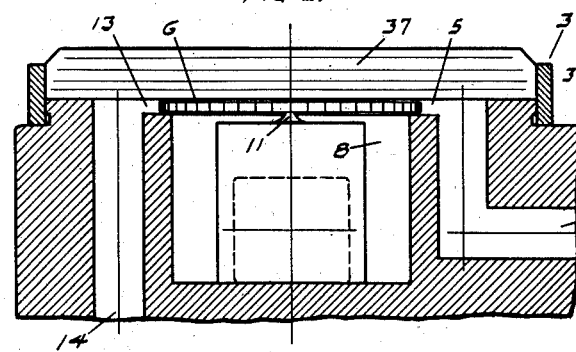
Figure 4:
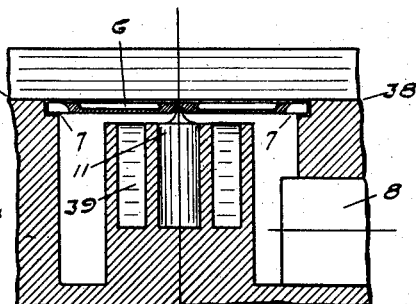
Figure 1:
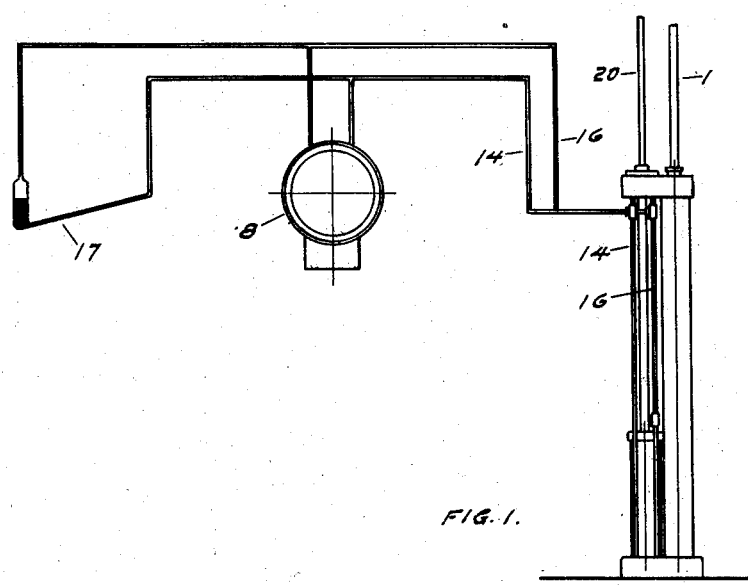
Figure 1 is a general elevation of the machine.

Figures 3 and 4 are vertical sections of Figure 2 on lines 3—3 and 4—4 respectively.

Figure 5:
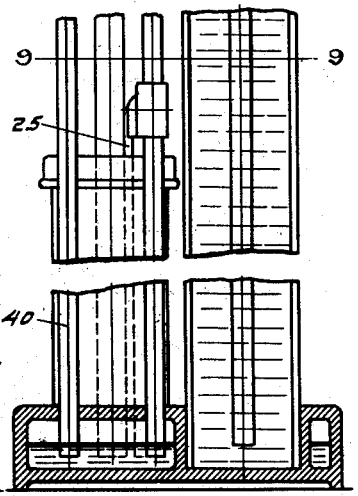

Figure 5 is a front elevation of the apparatus partly in section.

Figure 6:
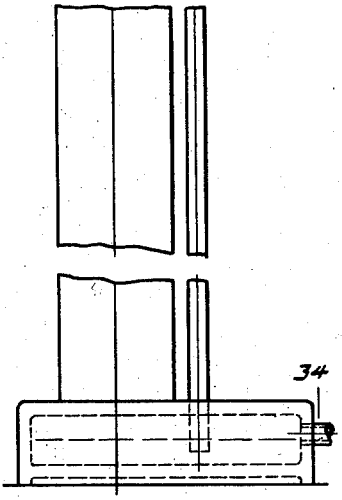

Figure 6 is a side elevation of the same.

Figure 7:
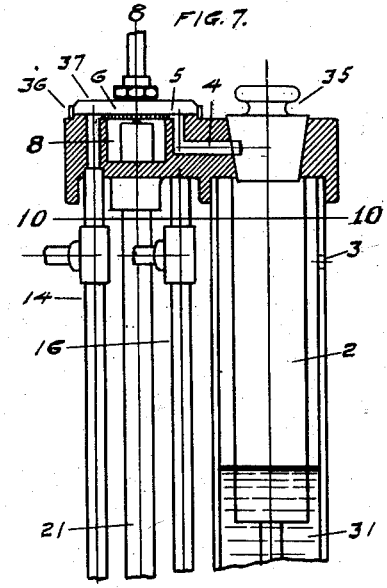

Figure 7 is a top plan view.

Figure 8:
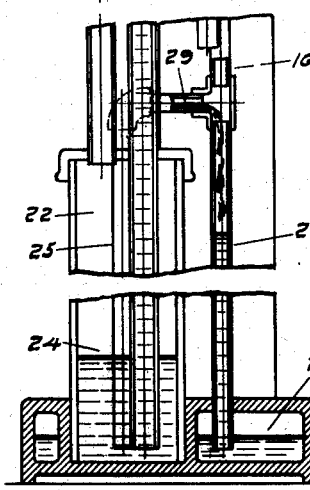

Figure 8 is a vertical section on line 8—8 of Fig. 7.

Figure 9:
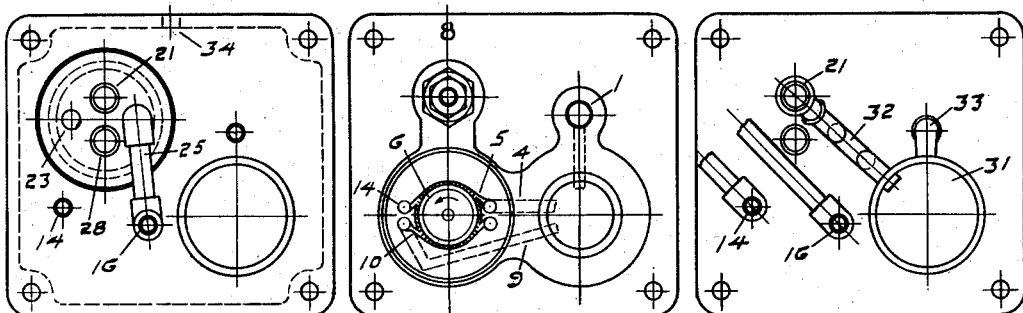
Figure 9:
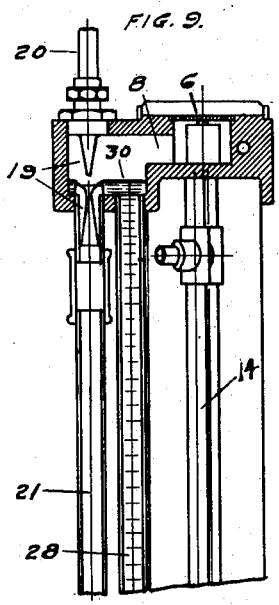

Figure 9 is a sectional view on line 9—9 of Fig. 5.

Figure 10:
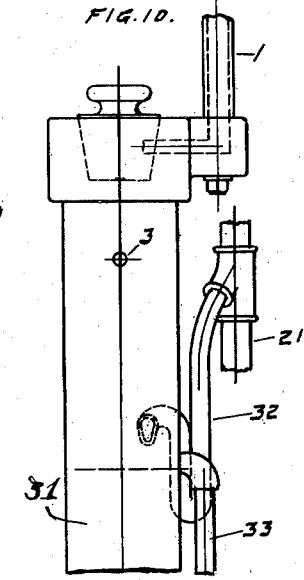

Figure 10 is a sectional view on the line 10—10 of Figure 5.

Figure 11 is a central vertical section of a modification showing the centrifugal apparatus.

Figure 12 is a section taken on the line 12—12 of Figure 11, looking in the direction indicated by the arrows.

Figure 13 is a bottom plan view of the device shown in Figure 11.

Various parts have been distorted in the conventional manner to show the construction more clearly.

As shown on the drawings:

The reference numeral 1 indicates a pipe through which gas is withdrawn from the flue in the usual manner and passed through a filter 2. Filter 2 is substantially the same as that described in my copending application Serial No. 426,730, filed November 27, 1920, to which reference is made.

A sample of air is drawn in through opening 3. The air and gas are passed through the filter 2 in separate compartments and cleaned and brought to a uniform condition of temperature and humidity as described in the application previously referred to. From the filter the gas passes through tube 4 and nozzle 5 impinging on the rotor 6 and thence downward through openings 7 in the bottom of the rotor to suction chamber 8. The air follows a similar course through passage 9 and nozzle 10.

The rotor 6 is supported on pivot 11 and rotates freely under the action of the jets of air and gas which act in the same tangential direction. As the buckets 12 of the rotor pass under the stream of gas from nozzle 5 the contained air is displaced by gas, the air and any surplus gas passing down into suction chamber 8 through the openings 7. A similar action takes place at air jet 10, the gas in the buckets being displaced by air. The buckets 12 being open on the lower side to the chamber 8, the streams of gas and air are immediately reduced to the static pressure obtaining in chamber 8. The function of the rotor is to reduce the streams of gas and air to equal static pressure and equal velocity.

The stream of gas impinges on gas impact tube 13, building up a pressure in pipe 14. The stream of air impinges on air impact tube 15, building up a pressure in pipe 16. As the temperature, humidity, static pressure and velocity of the two streams are the same, the impact pressure in the impact tubes and the pipes 14 and 16 will vary directly as the density of the gas and air respectively. These pressures are transmitted to differential gauges 17 and 18, which indicate and record the results in the usual manner. The gauges may be graduated in percentages of $CO_2$.

The suction in chamber 8 is maintained by means of a steam ejector 19 supplied by steam pipe 20. The entrained air and gas with the steam and condensate passes downward through pipe 21 to chamber 22, the gases escaping to the atmosphere at vent 23 and the water falling to reservoir 24.

For proper operation, it is necessary that one of the impact pressures be held constant. This may be either the air impact pressure or that of the gas. In this description of the invention the air impact pressure is used, which is represented by the difference in pressure between suction chamber 8 and impact pipe 16. This pressure difference is the only constant maintained throughout the entire machine, all other pressures being automatically varied to meet this requirement.

The pressure in pipe 16 is always below atmospheric, due to the resistance of the filter, piping, etc., as represented by water column 26—27.

The water in chamber 22 is open to the atmosphere, the water level 24 being controlled by a suction in pipe 16, which pipe is branched as shown at 25 and 29, the lower end of this branch being below the water surface. Due to the condensate from the ejector 19, water level 24 tends constantly to rise. When the distance between points 24 and 29 becomes less than the height of the water column 26 to 27, which represents the suction in pipe 16, the water in 22 will overflow into reservoir 26, which is provided with a drain 34, and is also open to atmospheric pressure. In this manner the suction in pipe 16 is constantly represented by the water column 24—29, which is the same as 26—27, although the actual height of the water surface 24 may be varied in order to maintain this condition in case of slight variations of the suction in 16.

The capacity of the ejector 19 is larger than is required for normal operation, so that the suction in chamber 8 tends to constantly increase. This suction is represented by the height of the water column 24 to 30. When suction in chamber 8 becomes excessive, water surface 30 rises slightly, allowing the water to overflow and flood the ejector 19 causing a braking effect due both to inertia and to condensation. This immediately reduces the capacity of the ejector, thereby reducing the suction in chamber 8. In this manner suction in chamber 8 is held substantially constant at the value represented by the water column 24 to 30.

Since the pressure in impact pipe 16 is represented by the water column 24 to 29, and the pressure in suction chamber 8 is represented by the water column 24 to 30, the difference in pressure between chamber 8 and the impact pipe 16 will be represented by the water column 29 to 30, which is a constant quantity. This constant quantity represents the impact pressure on the air side which is the desired condition and constitutes a standard from which the density of the gas is determined.

This arrangement automatically compensates for any variation in barometric pressure, flue draft, filter resistance, pipe and nozzle resistance, temperature or other minor variables which enter into the operation of the machine. It is obvious, of course, that the speed of the rotor 6 is not constant, but varies to accommodate itself to the foregoing conditions.

Makeup water to the filter reservoir 31 is supplied through condensation in pipe 32, which is attached to ejector exhaust pipe 21. The surplus water of the filter reservoir 31 is removed to overflow pipe 33. If desirable to avoid any slight heating effect from the ejector 19, this may be separated entirely from the main body of the machine by a short length of pipe. The filter is removable by means of tapered plug 35, as described in the application previously mentioned.

Access to the rotor 6 may be had by removing loose ring 36 and sliding off the plate glass cover 37, which is provided with a lapped joint at 38 to prevent leakage. The rotor may then be lifted off its pivot 11. Lubrication of the rotor is effected by oil reservoir 39, the oil creeping over the surface of the pivot. Rotor 6 is held in a horizontal position by the air cushion formed between its upper surface and the glass 37 which becomes effective at high speed.

When the machine is operated with air on both sides, the gas pipe 14 is under a suction equivalent to water column 26—27 of air pipe 16, but when flue gas is introduced into the gas side, the suction falls somewhat due to the excess impact of the flue gas over that of the air. The lower end of pipe 14 is submerged beneath the surface of the water in the reservoir 26, as shown at 40, the object being to provide an outlet for any condensation which may occur in pipe 14. The lower end of the pipe is water sealed in order to maintain the suction in the same.

In the centrifugal modification shown in Figure 11, a rotor consisting of two identical sets of blades, 42 and 43 is formed integral with a shaft 44 having extensions 45. These blades 42 and 43 may be built into the shaft if desired, but the best and strongest construction is to have them made integral therewith. The extensions 45 of the rotor are made in the form of axles and are adapted to rotate in bearings 46 which are suitably mounted in a casing 47. The casing 47 is provided with three chambers 48, 49 and 50, the chambers 48 and 50 being exactly alike and adapted to contain the paddle or blade members 42 and 43 respectively. The central chamber 49 communicates with the chambers 48 and 50 by means of two annular openings 51 and 52.

The chambers 48 and 50 are provided with a combined tube and inlet nozzle 53 and 54 respectively which connect with said chambers at their peripheries in a tangential direction. Chambers 48 and 50 are likewise provided with pressure tubes 55 and 56 respectively, as best shown in Figure 13, which connect with said chambers in a radial direction to their peripheries. The central chamber 49 is provided with an exhaust tube 57 connected therewith in a tangential direction, and in operation a partial vacuum is maintained in tube 57 as already described. This vacuum being communicated to chambers 48 and 50 through the openings 51 and 52 causes a flow of gas through the nozzles 53 and 54 which are connected to suitable sources of supply as previously described. The impact of the streams of gas from nozzles 53 and 54 striking the blades 42 and 43 in the same tangential direction causes rotation of the blades at high velocity. This rotation sets up a centrifugal pressure between the annular openings 51 and 52 and the peripheries of chambers 48 and 50 respectively. Since the chambers and blades are identical and both sets of blades revolve at the same speed, the pressure produced in pipes 55 and 56 will be directly proportional to the density of the gases in chambers 48 and 50 respectively, which pressure is then measured on a suitable differential gauge, as previously described. The direction of flow of gases and direction of rotation of the paddle blades is indicated by the arrows in the figures.

The action of this machine depends upon the impact of two streams of gas moving at uniform velocity. It is evident, however, that with a very slight modification of construction the centrifugal forces of the two gases might be compared without departing from the general mode of operation. In this case separate paths through the rotor would probably be provided for the two gases with a common discharge into the suction chamber. In the impact machine substantially only the impact or velocity pressure are compared. In the centrifugal machine substantially only the centrifugal pressures would be compared. This is essentially a matter of the arrangement of the tubes 13 and 15, which in the impact machine are tangential and in the centrifugal machine would be radial. Obviously a combination of the two may be used if desired.

The advantages claimed for this machine are extreme simplicity as it has only one moving part; a governing device operated by a column of water only, eliminating all moving mechanical parts; the elimination of the use of chemicals; the elimination of the dependence on local water supply, which is apt to prove troublesome; the ready accessibility of all parts for cleaning or inspection; low operating cost, as a minute jet of steam only is required; a mechanical device readily understood and operated by mechanical men, as compared with a complicated piece of chemical apparatus; and the use of a large gas sample giving practically instantaneous results. This latter is especially important in connection with automatic furnace control devices.

I am aware that numerous details of construction may be varied through a wide range without departing from the principles of this invention, and I therefore do not purpose limiting the patent granted otherwise than necessitated by the prior art.

I claim as my invention:

1. In an apparatus for determining the relative density of two gases, the combination of means for producing a stream of each gas, a rotor acting in conjunction with the gas streams, and means for measuring the velocity heads produced by the motion of the gases with the rotor.

2. In an apparatus for determining the relative density of two gases, the combination of means for producing a stream of each gas, a rotor operated by the gas streams, said gas streams acting at an angle to the periphery of the rotor, and means for measuring the difference in velocity head produced.

3. In an apparatus for determining the relative density of two gases, the combination of means for producing a stream of each gas, a rotor operated by the gas streams, said gas streams acting at an angle to the periphery of the rotor and means for measuring the difference in velocity head produced.

4. In an apparatus for determining the relative density of two gases, a suction chamber, a pair of impact pressure measuring devices connected thereto, means for producing a partial vacuum in the suction chamber, and means for maintaining the difference in pressure between one of the impact pressure measuring devices and the suction chamber constant.

5. In an apparatus for determining the relative density of two gases, a suction chamber, a pair of impact pressure measuring devices connected thereto, means for producing a partial vacuum in the suction chamber, and means for maintaining the difference in pressure between one of the impact pressure measuring devices and the suction chamber constant, said means including a device actuated by the inertia of a relatively stationary fluid body for controlling the vacuum producing means.

6. In an apparatus for determining the density of a gas, a filter and temperature control means for the gas, a rotor operated by a stream of gas, a gas receiving chamber adjacent said rotor, a pressure measuring means connected with said chamber, and an automatically regulated device for maintaining the pressure difference between said measuring means and the gas receiving chamber constant.

7. In an apparatus for determining the relative density of two gases, suction means for producing a moving stream of each gas, a rotor operated upon by both streams of gases for producing subsidiary streams of equal velocity and means for measuring the velocity heads of such subsidiary streams.

8. In an apparatus for determining the relative density of two gases, a suction operated rotor, said rotor being operated by streams of the gases, means including said rotor adapted to bring the gases to uniform pressure and velocity, and means for indicating the impact pressure of each gas.

9. In an apparatus for determining the relative density of two gases, a filter for the gases, a rotor operated by the gases, an ejector for moving the gases, a governor to maintain the impact pressure of one of said gases constant, and a gauge for determining the relative pressures produced.

10 In an apparatus for determining the relative density of two gases, a rotor, a steam ejector for producing streams of gas through said rotor to operate the same and means for measuring the velocity head of the gases passing from said rotor.

11. In an apparatus for determining the relative density of two gases, a removably mounted rotor, means for impinging streams of gas upon said rotor to operate the same, and means for measuring the velocity head of the gases passing from said rotor.

12. In an apparatus for determining the relative density of two gases, a rotor having buckets thereon open at both their inner and outer ends, means for producing streams of gas inwardly through such buckets to operate the rotor, and means for measuring the velocity head of the gases passing outwardly from such buckets.

13. In an apparatus for determining the relative density of two gases, a rotor having buckets thereon, means for producing streams of gas through said rotor to operate the same and means for measuring the velocity head of the gases passing from the rotor, said rotor being constructed to allow the buckets to receive a fresh charge of gas at each revolution.

14. In an apparatus for determining the relative density of two gases, the combination of a container, means for producing a stream of each gas therethrough, a rotor in the container operated by the gas streams, and a removable cover for the rotor container whereby the same may be readily cleaned.

15. In an apparatus for analyzing a gas, the combination of means for producing a stream of such gas and a standard gas, a rotor operated by the gas streams and means for measuring the velocity head of the gas as it leaves said rotor.

In testimony whereof I have hereunto subscribed my name in the presence of two subscribing witnesses.

ROSS F. MacMICHAEL.

Witnesses:
ALBERT J. FIHE,
SPENCER W. GIBBS.